United States Patent
Tabata et al.

(10) Patent No.: US 7,618,705 B2
(45) Date of Patent: Nov. 17, 2009

(54) PRESSURE-SENSITIVE ADHESIVE SHEET FOR TIRE AND METHOD FOR MANUFACTURING THE SAME

(75) Inventors: Kouji Tabata, Saitama (JP); Yoshitomo Ono, Saitama (JP); Tetsuyuki Utagawa, Saitama (JP); Tatsuya Tsukida, Saitama (JP)

(73) Assignee: Lintec Corporation, Tokyo (JP)

(*) Notice: Subject to any disclaimer, the term of this patent is extended or adjusted under 35 U.S.C. 154(b) by 651 days.

(21) Appl. No.: 10/573,841

(22) PCT Filed: Aug. 17, 2004

(86) PCT No.: PCT/JP2004/011757

§ 371 (c)(1),
(2), (4) Date: Mar. 28, 2006

(87) PCT Pub. No.: WO2005/037945

PCT Pub. Date: Apr. 28, 2005

(65) Prior Publication Data

US 2007/0054118 A1    Mar. 8, 2007

(30) Foreign Application Priority Data

Oct. 17, 2003   (JP) .............................. 2003-357252

(51) Int. Cl.
  B32B 7/12       (2006.01)
  B32B 27/00      (2006.01)
  B32B 9/00       (2006.01)
(52) U.S. Cl. .............................. 428/355 BL; 428/40.1; 428/355 R; 428/355 N; 428/500
(58) Field of Classification Search .................. None
See application file for complete search history.

(56) References Cited

U.S. PATENT DOCUMENTS 4,683,172 A * 7/1987 LeGrand et al. .............. 428/412
5,500,293 A * 3/1996 Lau et al. ................. 428/355 N
5,993,961 A * 11/1999 Ugolick et al. .............. 428/354

(Continued)

FOREIGN PATENT DOCUMENTS

JP           10-147757          6/1998

(Continued)

OTHER PUBLICATIONS

"Secchaku Handbook" with Partial English Translation, Jun. 28, 1996, The Nikkan Kogyo Shimbun, Ltd., 3rd Edition.

*Primary Examiner*—James Seidleck
*Assistant Examiner*—John J Figueroa
(74) *Attorney, Agent, or Firm*—Carmody & Torrance LLP

(57) ABSTRACT

A pressure-sensitive adhesive sheet for a tire that can be favorably attached to tires at low temperature and to tires such as studless tires is provided, as is a method for manufacturing the pressure-sensitive adhesive sheet for a tire. For the pressure-sensitive adhesive sheet for a tire and the method for manufacturing, the pressure-sensitive adhesive sheet for a tire includes a substrate and an adhesive layer, and the adhesive layer includes a hot melt-type adhesive composition and satisfies adhesive characteristics (A) and (B), where (A) loop tack adhesion at 5° C. is 14N/25 mm or more, and (B) loop tack adhesion at 40° C. is 5N/25 mm or more.

6 Claims, 4 Drawing Sheets

RELATIONSHIPS BETWEEN LOOP TACK ADHESIONS AT 5° C AND 40° C OF VARIOUS SAMPLES

U.S. PATENT DOCUMENTS

| | | | |
|---|---|---|---|
| 6,074,747 A * | 6/2000 | Scholz et al. | 428/352 |
| 6,652,963 B2 * | 11/2003 | Husemann et al. | 428/355 AC |
| 6,663,958 B2 * | 12/2003 | Husemann et al. | 428/355 AC |
| 2002/0193724 A1 * | 12/2002 | Stebbings et al. | 602/54 |

FOREIGN PATENT DOCUMENTS

| | | |
|---|---|---|
| JP | 11-80690 | 3/1999 |
| JP | 2000-204334 | 7/2000 |
| JP | 2000-319618 | 11/2000 |
| WO | WO 96/11236 | 4/1996 |
| WO | WO 96/27644 | 9/1996 |
| WO | WO 02/00805 A2 | 1/2002 |

* cited by examiner

PRESSURE-SENSITIVE ADHESIVE SHEET FOR TIRE AND METHOD FOR MANUFACTURING THE SAME

CROSS REFERENCE TO RELATED APPLICATIONS

This application is a National Stage application of International Application No. PCT/JP2004/11757, filed Aug. 17, 2004.

TECHNICAL FIELD

The present invention relates to a pressure-sensitive adhesive sheet for a tire and a method for manufacturing a pressure-sensitive adhesive sheet for a tire, and in particular to a pressure-sensitive adhesive sheet for a tire having a high adhesion for tires at low temperature and for a studless tire and a method for manufacturing the same.

BACKGROUND ART

Pressure-sensitive adhesive sheets for a tire referred to as tire display labels and the like are conventionally known. To inform customers of tire information and stimulate consumer demand, such adhesive sheets include a tire display part including information such as the tire manufacturer and brand names, the tire size (width, flat ratio, and rim ratio), and warnings relating to tire use, and are used for adhering onto an area of the tire including the tread surface. That is, a pressure-sensitive adhesive sheet for a tire is normally constructed of a film with a deposited aluminum layer as a substrate, and an adhesive layer that has a rubber resin or an acrylate alkyl ester resin as a main component being formed in a layer on the substrate.

A pressure-sensitive adhesive sheet for a tire has been disclosed that uses a white-colored film as the surface material. Such white-colored film uses a polypropylene resin as a surface substrate, includes internal voids, and is composed of three or more biaxial stretching films, and includes an adhesive layer that has a predetermined adhesion for the white-colored film and is mainly composed of a cross-linked acrylate alkyl ester resin (refer, for example, Patent Document 1).

Also, a pressure-sensitive adhesive sheet for a tire that includes an anchor coat layer, a layer of a polyvinylidene chloride-vinyl chloride copolymer, and an adhesive layer having a predetermined adhesion to the surface of a polypropylene film including a white pigment, has been disclosed (refer, for example, Patent Document 2).

Moreover, a pressure-sensitive adhesive sheet for a tire having an adhesive layer that includes a predetermined amount of natural rubber, an ABA-type block copolymer, and a tackifier, has been disclosed (refer, for example, Patent Document 3).

However, extremely large convexes and concaves are formed on the tread surface of a tire, and due to the air vent holes in a mold which is used when molding a tire, whisker-like projections called "spews" are formed on the tire, which makes it difficult for a pressure-sensitive adhesive sheet for a tire to accurately adhere to the tire. In addition, not a small amount of the mold releasing agent which is used when manufacturing tires is transferred and adheres to the surface of the tire, so that the problem of pressure-sensitive adhesive sheets for a tire that have been adhered to the tire being susceptible to peeling off during storage and transportation of the tires has been observed. In particular, during winter season when the external air temperature falls to around 5° C., for example, the adhesion correspondingly decreases and the adhesive sheets becomes to be peeled off. When the pressure-sensitive adhesive sheets for a tire are adhered to studless tires, the surface of the tire has a special convex/concave pattern and contains special additives, so that the adhesion to such tires becomes low and the peeling off of the pressure-sensitive adhesive sheets during the storage and transportation of tires, has been especially observed.

In addition, with the conventional pressure-sensitive adhesive sheets for a tire described above, when anyone of the described adhesive layers is provided, an application process is carried out by using a solvent which is then removed by a drying process, but this results in the problems of an increase in the scale of the manufacturing process, an increase in the manufacturing time, and insufficient consideration of environmental matters (refer Patent Documents 1 to 3). In particular, when a polyvinylidene chloride-vinyl chloride copolymer is provided as even just part of a pressure-sensitive adhesive sheet for a tire (refer Patent Document 2, for example), the environmental problem of the likely emission of dioxin during incineration of the tire has been observed.

Patent Document 1:JP10-147757A
Patent Document 2:JP2002-294187A
Patent Document 3:JP11-80690A Thus, by carrying out careful research, the inventors of the present invention have discovered that by using a pressure-sensitive adhesive sheet for a tire that uses a hot melt-type adhesive composition having the special adhesive characteristics (loop tack adhesion), it is possible to easily solve the problem of pressure-sensitive adhesive sheets for a tire in peeling off during the storage and transportation of tires.

That is, it is an object of the present invention to provide a pressure-sensitive adhesive sheet for a tire and a method for manufacturing the same, where the pressure-sensitive adhesive sheet for a tire has a strong adhesion for a tire even at low temperature, can strongly adhere to a studless tire, and whose characteristics do not greatly deteriorate at high temperature.

DISCLOSURE OF THE INVENTION

The present invention solves the problems described above by providing a pressure-sensitive adhesive sheet for a tire including a substrate and an adhesive layer, wherein the adhesive layer includes a hot melt-type adhesive composition and satisfies adhesive characteristics (A) and (B), where (A) loop tack adhesion at 5° C. is 14N/25 mm or more, and
(B) loop tack adhesion at 40° C. is 5N/25 mm or more.

Here, the loop tack adhesion at 5° C. is controlled within a predetermined range so that even at low temperature during winter season, a strong adhesion is exhibited for tires, so that after adhering, a pressure-sensitive adhesive sheet for a tire can strongly adhere to a tire without lifting or peeling off. In the same way, the loop tack adhesion at 40° C. is controlled to a predetermined value, so that even at high temperature during summer season, a sufficient adhesion is exhibited for tires. Thus, after adhering, a pressure-sensitive adhesive sheet for a tire can strongly adhere to a tire without lifting or peeling off. That is, by satisfying both conditions of (A) and (B) given above, it is possible to select a pressure-sensitive adhesive sheet for a tire that can be used at a wide range of temperature.

It should be noted that when measuring the loop tack adhesions at 5° C. and 40° C., a method described later in example 1 can be used.

Also, when constituting a pressure-sensitive adhesive sheet for a tire according to the present invention, a holding power of the hot melt-type adhesive composition should preferably be in a range of 1,500 to 12,000 seconds as measured in accordance with JIS K 2207 standard.

Also, when constituting a pressure-sensitive adhesive sheet for a tire according to the present invention, the hot melt-type adhesive composition should preferably have (C) 15 to 40% by weight of an ABA-type block copolymer, (D) 30 to 70% by weight of two or more types of a tackifier having different softening points, and (E) 10 to 40% by weight of plasticizer, as main components, with at least one out of the (D) two or more types of a tackifier having different softening points, being a tackifier having a softening point of 60 to 100° C. as measured in accordance with JIS K 2207 standard.

When constituting a pressure-sensitive adhesive sheet for a tire according to the present invention, the hot melt-type adhesive composition is preferably a mixture of styrene-isoprene-styrene copolymer (SIS) as an ABA-type block copolymer and styrene-isoprene copolymer (SI) as an AB-type block copolymer, with the additional amount of the AB-type block copolymer being at least 30% by weight with respect to the overall weight.

When constituting a pressure-sensitive adhesive sheet for a tire according to the present invention, a content of polystyrene domain should preferably be 20% by weight or less with respect to 100% by weight of the ABA-type block copolymer.

When constituting a pressure-sensitive adhesive sheet for a tire according to the present invention, the plasticizer should preferably be paraffin process oil.

When constituting a pressure-sensitive adhesive sheet for a tire according to the present invention, a metal layer should preferably be provided between the substrate and the adhesive layer.

Another aspect of the present invention is a method for manufacturing a pressure-sensitive adhesive sheet for a tire including a substrate and an adhesive layer, the method including a step of forming the adhesive layer by applying a hot melt-type adhesive composition that satisfies adhesive characteristics (A) and (B) on the substrate, where (A) loop tack adhesion at 5° C. is 14N/25 mm or more, and (B) loop tack adhesion at 40° C. is 5N/25 mm or more.

BEST MODE FOR CARRYING OUT THE INVENTION

First Embodiment

As shown in FIGS. 1A to 1D, a first embodiment is a pressure-sensitive adhesive sheet for a tire including a substrate 10 and an adhesive layer 11, where the adhesive layer 11 includes a hot melt-type adhesive composition and satisfies the adhesive characteristics (A) and (B), where (A) loop tack adhesion at 5° C. is 14N/25 mm or more, (B) loop tack adhesion at 40° C. is 5N/25 mm or more.

It should be noted that the pressure-sensitive adhesive sheets for a tire illustrated in FIGS. 1A to 1D are schematically shown in cross-section in a state where a releasing films 12 are provided on the surfaces of the respective adhesive layers 11.

1. Substrate (1) Type

The type and construction of the substrate 10 that composes a part of the pressure-sensitive adhesive sheets for a tire illustrated in FIGS. 1A to 1D are not subjected to any particular limitations, and a well-known plastic film, paper, or synthetic material with internal voids can be used.

However, a plastic film or synthetic paper is preferable since such materials have superior mechanical strength so that it is possible to effectively prevent the substrate from breaking during releasing.

Figure 1:
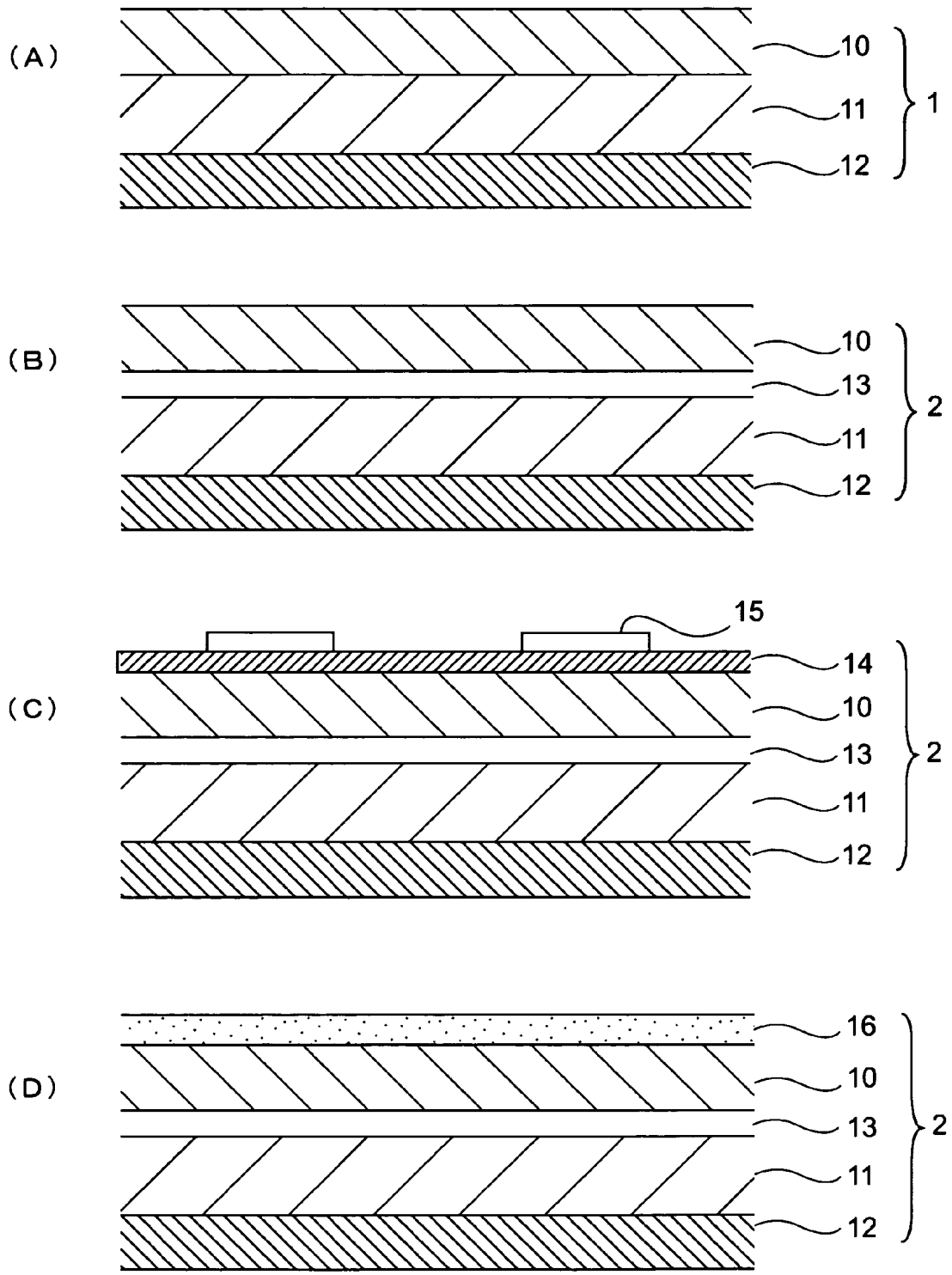
FIGS. 1A to 1D are schematic cross-sectional views useful in explaining the constructions of respective pressure-sensitive adhesive sheets for a tire.

In terms of construction, as shown in FIG. 1B, the substrate 10 should preferably include a metal layer 13, such as a deposited aluminum layer. The reason for this is that by constituting a pressure-sensitive adhesive sheet for a tire with the metal layer 13 between the substrate 10 and the adhesive layer 11, it is possible to effectively prevent a blackening phenomena of the substrate surface due to transfer of the components of the tire compound. More specifically, although there are cases where the substrate surface is blackened due to transfer to the substrate of an amine antioxidant, an aromatic oil, or the like that is a component of the rubber material composing a tire, the metal layer 13 can prevent such transfer.

Regarding the construction of the substrate, a primer layer 14 that facilitates the formation of a printing layer 15 as shown in FIG. 1C, a recording layer 16 that can be recorded by thermal transfer recording or ink jet recording as shown in FIG. 1D, and an information region (not shown) such as a magnetic recording, a barcode, or a micro semiconductor element can be provided as parts of a substrate 10.

(2) Thickness

The thickness of the substrate should preferably be set in a range of 10 to 150 μm. The reason for this is that when the thickness of the substrate is below 10 μm, it becomes difficult to handle the pressure-sensitive adhesive sheet for a tire and the pressure-sensitive adhesive sheet for a tire can become wrinkled when adhered onto the tire and the substrate can break during releasing.

On the other hand, when the thickness of the substrate is above 150 μm, as the flexibility falls, there are cases where the ability of the pressure-sensitive adhesive sheet for a tire to assume the shape of a tire decreases and the pressure-sensitive adhesive sheet for a tire can become susceptible to peeling off a tire. In addition, the thickness of the substrate should more preferably be set in a range of 10 to 150 μm.

2. Adhesive Layer (1) Type (1)-1 Main Component

So long as a predetermined loop tack adhesion is achieved, there are no particular limitations on the type of a hot melt-type adhesive composition that composes the adhesive layer, and as examples, it is possible to use a conventional adhesive such as natural rubber, synthetic rubber, acrylic, urethane, or silicon adhesive, but it is preferable to use an ABA-type block copolymer.

That is, the adhesive layer should preferably be composed of a hot melt-type adhesive composition that includes;
(C) 15 to 40% by weight of an ABA-type block copolymer,
(D) 30 to 70% by weight of two or more types of a tackifier having different softening points (total weight), and
(E) 10 to 40% by weight of plasticizer
as main components, with at least one out of the (D) two or more types of a tackifier having different softening points being a tackifier having a softening point of 60 to 100° C. as measured in accordance with JIS K 2207 standard.

The reason for this is that the loop tack adhesion at a plurality of temperatures can be easily adjusted in this type of hot melt-type adhesive composition. Also, when this pressure-sensitive adhesive sheet for a tire is used even during winter season when the external air temperature is low and/or when the pressure-sensitive adhesive sheet for a tire is adhered to a studless tire, it is possible for the pressure-sensitive adhesive sheet for a tire to accurately adhere to the tire with little lifting or peeling off. Moreover, the problems of lifting and peeling off after adhering of the pressure-sensitive adhesive sheet for a tire are avoided during summer season, when the external air temperature is high, and since there is no need to use a solvent or carry out drying when the adhesive layer is formed. In addition, the scale of a manufacturing apparatus may be reduced and the manufacturing time may be shortened.

Here, the expression "ABA-type block copolymer" is a copolymer in which two types of a single polymer, an A component and a B component, are set in blocks and polymerized, and when the A component is a resin component and the B component is a rubber component, both ends of the rubber component (B component) are bound by the domains of the resin component (A component).

A styrene-isoprene-styrene copolymer (SIS), a styrene-butadiene-styrene copolymer (SBS), and the like are representative examples of ABA-type block copolymers, but since tackifying is easy and the adjustment of the loop tack adhesion at low temperature is further facilitated, styrene-isoprene-styrene copolymer (SIS) should preferably be used.

The additional amount of an ABA-type block copolymer should preferably be set in a range of 15 to 40% with respect to the total weight of the hot melt-type adhesive composition.

The reason for this is that if the additional amount of an ABA-type block copolymer is below 15% by weight, the cohesive force of the entire adhesive is reduced and during summer season, when the external air temperature is high, there are cases where there is a prominent deterioration in characteristics, oozing from the adhesive sheet cross section, and deterioration in cutting property of the adhesive during a punching out process.

On the other hand, if the additional amount of an ABA-type block copolymer is above 40% by weight, the loop tack adhesion decreases, and when adhered to a tire, the pressure-sensitive adhesive sheet for a tire cannot strongly adhere, with it being especially difficult for the pressure-sensitive adhesive sheet for a tire to adhere to the tire at low temperature conditions. In addition, there are also cases where there is the problem that the melt viscosity increases and the applicability of the adhesive to hot melt coating decreases.

In addition, the additional amount of an ABA-type block copolymer should more preferably be set in a range of 18 to 30% by weight with respect to the total weight of the hot melt-type adhesive composition.

When the ABA-type block copolymer is a triblock copolymer, it is preferable to add diblock copolymer that is an AB-type block copolymer so that the additional amount of the diblock copolymer is in a range of 30 to 60% by weight with respect to 100% of the weight of the triblock copolymer.

The reason for this is that when the additional amount of the diblock copolymer is below 30% by weight, the loop tack adhesion at low temperature is insufficient, so that there are cases where the pressure-sensitive adhesive sheet for a tire is susceptible to lifting or peeling off a tire. On the other hand, when the additional amount of the diblock copolymer is above 60% by weight, the cohesive force of the entire adhesive decreases and there are cases where there is oozing or the adhesive left on the tire after releasing of the label such as the pressure-sensitive adhesive sheet for a tire.

It should be noted that when the ABA-type block copolymer is styrene-isoprene-styrene copolymer (SIS), it is preferable to use the same type of styrene-isoprene copolymer (SI) as the AB-type block copolymer.

In this ABA-type block copolymer, the content of the polystyrene domain should preferably be 20% by weight or lee with respect to 100% by weight of the ABA-type block copolymer.

The reason for this is that if the content of the polystyrene domain is over 20% by weight, the content of isoprene that greatly contributes to the high adhesion is insufficient, so that the loop tack adhesion decreases and when the pressure-sensitive adhesive sheet for a tire is adhered to a tire, strong adhesion is not possible, with it being especially difficult to adhere for the pressure-sensitive adhesive sheet for a tire in low temperature conditions. In addition, there are also cases where there is the problem that the melt viscosity increases and the applicability to hot melt coating decreases.

However, when the content of polystyrene domain is excessively low, the cohesive force decreases and there are cases where there is oozing or the adhesive left on the tire after releasing of the label such as the pressure-sensitive adhesive sheet for a tire. Accordingly, it is more preferable for the content of the polystyrene domain to be in a range of 10 to 20% by weight.

(1)-2 Tackifier

When composing a hot melt-type adhesive composition, a tackifier should preferably be added. Here, there are no particular limitations on the type of tackifier, and examples of such include at least one of a rosin derivative compound, a polyterpene resin, an aromatic compound-modified terpene resin and hydroxide compounds of the same, a terpene phenol resin, a coumarone-indene resin, an aliphatic petroleum resin, an aromatic petroleum resin and hydroxide compounds of the same, and a styrene resin or a low molecular weight styrene compounds.

Figure 2:
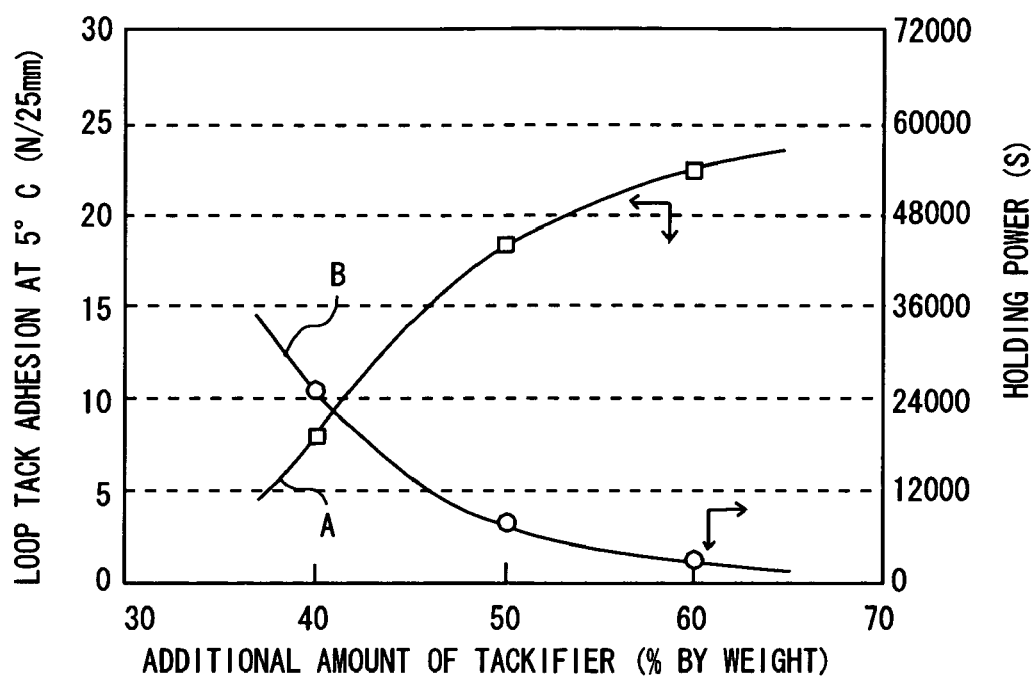
FIG. 2 is a graph showing the effects of the additional amount of tackifier (No1).
Figure 3:
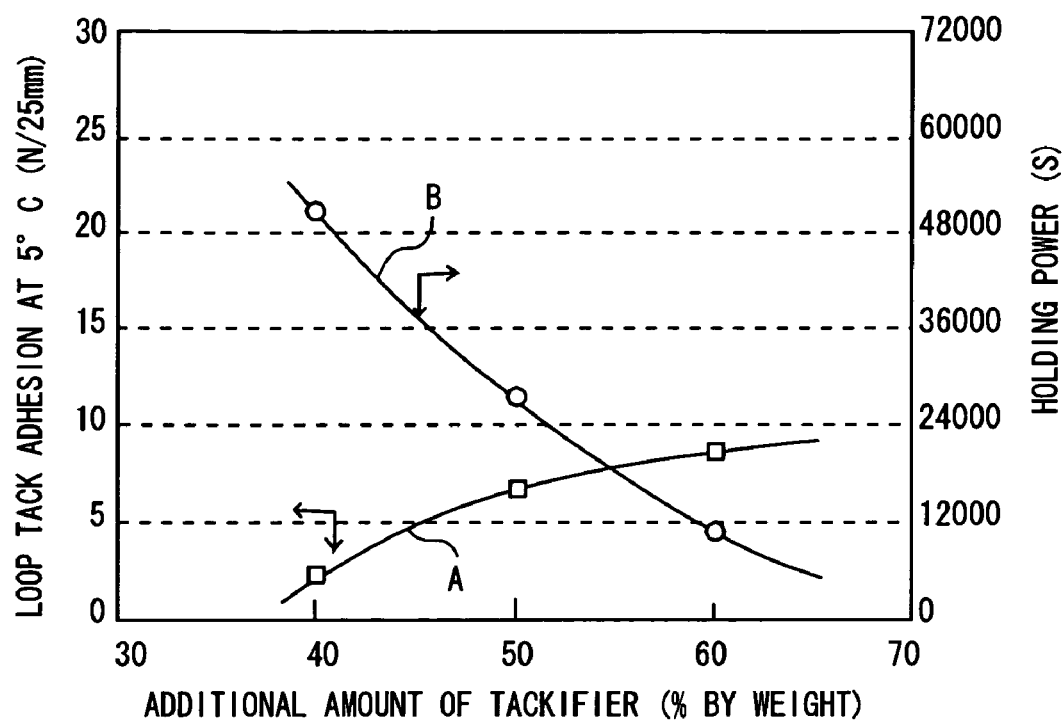
FIG. 3 is a graph showing the effects of the additional amount of tackifier (No2).

Regarding the types of a tackifier, by selectively being compatible with the tackifier in the rubber domain in the block copolymer, the loop tack adhesion can be easily adjusted. Accordingly, a rosin derivative, a polyester resin, and an aromatic petroleum resin and the like can be used more favorably since such substances are easy to be compatible with the polyisoprene domain, for example. More specifically, as shown in FIG. 2, when an aromatic petroleum resin, for example, is used as the tackifier, it is possible to change the loop tack adhesion at 5° C. with a comparatively small change in the additional amount (within a range of 40% to 60% by weight) (shown by the curve A in FIG. 2, with the variation width for the adhesion being 8 to 23N/25 mm). On the other hand, as shown in FIG. 3, when an aromatic compound-modified terpene resin is used, the loop tack adhesion at 5° C. hardly changes in response to a comparatively small change in the additional amount (within a range of 40% by weight to 60% by weight) (shown by curve A in FIG. 3, with the variation width for the adhesion being 2 to 8N/25 mm). It should be noted that the curves marked "B" in FIGS. 2 and 3 show the changes in holding power according to the additional amount of the tackifier.

It should be noted that a coumarone-indene resin or a low molecular weight styrene or a substituted styrene compound that are compatible with a polystyrene copolymer block, are preferably used in order to increase the cohesive force of the composite adhesive.

The additional amount of tackifier should preferably be set in a range of 30 to 70% by weight with respect to the overall weight.

The reason for this is that when the amount of tackifier is below 30% by weight, the adhesion is insufficient and there are cases where the pressure-sensitive adhesive sheet for a tire cannot be strongly adhered onto a tire. On the other hand, when the amount of tackifier is above 70% by weight, there are cases where there is oozing and deterioration in cutting property of the adhesive during a punching out process.

In addition, the additional amount of tackifier should more preferably be in a range of 40 to 65% by weight with respect to the overall weight.

It should be noted that as the softening point of the tackifier, it is preferable to use two or more types of a tackifier having different softening points. The reason for this is that a tackifier having a comparatively high softening point is effective at realizing adhesion at high temperature but loses its adhesion at low temperature, so that by also using a tackifier having a comparatively low softening point, it is possible to cover a wide range from a low temperature region to a high temperature region. For the present invention, it is possible to use a many kind of tackifier from materials that are in a liquid state at room temperature to materials having a softening point of around 150° C. as a maximum, but it is preferable to use at least one type of the tackifier having a softening point of 60 to 100° C. and more preferably 70 to 90° C. as measured in accordance with JIS K 2207 standard (ring and ball method). The reason for this is that when a tackifier having a softening point of 60 to 100° C. is used, the adhesion is improved from a low-temperature region to a room temperature region.

Also, with regard to the softening points of other tackifier used together, it is preferable to use a tackifier having a higher softening point than that having a softening point of 60 to 100° C.

In addition, it is preferable to use a tackifier having a softening point that is at least 30° C. higher than that having a softening point of 60 to 100° C.

(1)-3 Plasticizer

When composing the hot melt-type adhesive composition, it is preferable to add a plasticizer. Here, there are no particular limitations on the type of a plasticizer, and examples of such include paraffin-base process oil, naphthene-base process oil, a petroleum-base process oil such as an aromatic process oil, natural oil such as castor oil or tall oil, dibutyl phthalate, a diacid-base dialkyl such as dioctyl phthalate or dibutyl adipate, and a low molecular weight liquid polymer such as liquid polybutene or liquid polyisoprene.

Out of these, when a paraffin-base process oil is used, the pressure-sensitive adhesive sheet for a tire is especially stable with respect to heat and UV rays. This type of plasticizer is preferable since a hot melt-type adhesive composition of superior colors can be obtained.

It is possible to use paraffin-base process oil together with other plasticizers and in this case, it is preferable for the paraffin-base process oil to be at least 60% by weight with respect to the total weight (100%) of the plasticizer.

In addition, the additional amount of plasticizer should preferably be in a range of 10 to 40% by weight with respect to the total weight of the hot melt-type adhesive composition.

The reason for this is that when the additional amount of plasticizer is below 10% by weight, the plasticizing effect is insufficient, the loop tack adhesion is insufficient, and there are cases where strong adhesion cannot be achieved when the pressure-sensitive adhesive sheet for a tire is adhered onto a tire. On the other hand, when the additional amount of plasticizer is above 40% by weight, there are cases where there is oozing and deterioration in cutting property of the adhesive during a punching out process.

In addition, the additional amount of plasticizer should more preferably be in a range of 15 to 30% by weight relative to the total weight of the hot melt-type adhesive composition.

(1)-4 Additives

It is preferable for various types of conventionally known additives, such as fillers, inorganic particles, organic particles, light weighting materials, fluidizing agents, pigments, dyes, colorants, antioxidants, ultraviolet absorbers, and light stabilizers to be added as necessary to the hot melt-type adhesive composition of the present invention.

3. Loop Tack Adhesion

First, (A) the loop tack adhesion at 5° C. is controlled within a predetermined range since a strong adhesion for a tire is exhibited even at low temperature during winter season, with this having a close relationship to the prevention of lifting and peeling off of a pressure-sensitive adhesive sheet for a tire after adhering. That is, by setting the loop tack adhesion at 5° C. at 14N/25 mm or more, it will be possible to adhere a pressure-sensitive adhesive sheet for a tire onto a tire even at low temperature, such as temperature around 5° C., and the pressure-sensitive adhesive sheet for a tire can be strongly adhered onto a tire, such as a studless tire, where the adhering is comparatively difficult. On the other hand, when the loop tack adhesion at 5° C. is below 14N/25 mm, there may be the problem that the label such as the pressure-sensitive adhesive sheet for a tire becomes susceptible to lifting and peeling off the tire.

However, if the loop tack adhesion at 5° C. is excessively high, there may be cases where adhesive is left after the label such as the pressure-sensitive adhesive sheet for a tire has been released.

Accordingly, (A) the loop tack adhesion at 5° C. should more preferably be set in a range of 15 to 33N/25 mm.

On the other hand, (B) the loop tack adhesion at 40° C. is controlled at a predetermined value since a sufficient adhesion for a tire is exhibited even at high temperature during summer season, with this having a close relationship to the prevention of lifting and peeling off of a pressure-sensitive adhesive sheet for a tire after adhering. That is, by setting the loop tack adhesion at 40° C. at 5N/25 mm or more, there will be a sufficient adhesion on tires even at high temperature, so that it is possible to effectively prevent lifting and peeling off during the storage and transportation of tires. On the other hand, if loop tack adhesion at 40° C. is below 5N/25 mm, there are cases where pressure-sensitive adhesive sheets for a tire that have been adhered onto tires are susceptible to peeling off during storage or transportation.

However, if the loop tack adhesion at 40° C. is excessively high, there are cases where adhesive is left after the label such as the pressure-sensitive adhesive sheet for a tire is released.

Accordingly, (B) the loop tack adhesion at 40° C. should more preferably be set in a range of 6 to 15N/25 mm.

In this way, for a hot melt-type adhesive composition, it is important to simultaneously limit (A) the loop tack adhesion at 5° C. and (B) the loop tack adhesion at 40° C. respectively, and there is the possibility of problems occurring during actual use of a pressure-sensitive adhesive sheet for a tire even if one of such adhesive characteristics is not satisfied.

That is, by satisfying the two conditions (A) and (B) described above, it is possible to select a pressure-sensitive adhesive sheet for a tire that can be used in a wide range of temperature.

4. Holding Power

The holding power of the hot melt-type adhesive composition should preferably be set in a range of 1,500 to 12,000 seconds as measured in accordance with JIS K 2207 standard.

The reason for this is that if the holding power is below 1,500 seconds, there are cases where there is oozing and deterioration in cutting property of the adhesive during a punching out process for labels such as the pressure-sensitive adhesive sheet for a tire. On the other hand, if the holding power is above 12,000 seconds, the wettability of the adhesive with respect to tires at low temperature decreases, which makes pressure-sensitive adhesive sheets for a tire susceptible to lifting and peeling off after adhering.

The holding power of the hot melt-type adhesive composition should more preferably be set in a range of 2,000 to 10,000 seconds.

Second Embodiment

A second embodiment is a method for manufacturing a pressure-sensitive adhesive sheet for a tire including a substrate and an adhesive layer, and is a method for manufacturing a pressure-sensitive adhesive sheet for a tire that forms the adhesive layer by applying a hot melt-type adhesive composition that satisfies the adhesive characteristics (A) and (B), where (A) loop tack adhesion at 5° C. is 14N/25 mm or more, and (B) loop tack adhesion at 40° C. is 5N/25 mm or more.

Since the hot melt-type adhesive composition used below can be the same as that described in the first embodiment of the invention, the following description will focus on the method for manufacturing a pressure-sensitive adhesive sheet for a tire.

That is, in the second embodiment, the adhesive layer is formed from a hot melt-type adhesive composition and although there are no particular limitations on the method for manufacturing a pressure-sensitive adhesive sheet for a tire, it is preferable to use a transfer application method that applies a hot melt-type adhesive composition onto a releasing film, dries this adhesive as necessary, and then laminate with a substrate.

It is also preferable to use a method that directly applies the hot melt-type adhesive composition onto the substrate in advance, dries this adhesive as necessary, and then laminate with a releasing film.

There are no particular limitations on the application apparatus used for the hot melt-type adhesive composition, and it is possible to apply the adhesive using a conventionally known applier, such as a roll coater, a knife coater, a bar coater, a die coater, an air knife cutter, a gravure coater, a variogravure coater, and a curtain coater.

The applying amount of the hot melt-type adhesive composition should preferably be in a range where the dried weight is 20 to 120 g/m². The reason for this is that when the applying amount is below 20 g/m², there is insufficient adhesion to a tire, while when the applying amount is over 120 g/m², oozing may be caused and there may be cases where there is increased probability of problems with printing and punching out.

In addition, it is more preferable for the additional amount of the hot melt-type adhesive composition to be in a range of 30 to 80 g/m².

It should be noted that due to the properties of a composite adhesive of the present invention that has an ABA-type block copolymer as a main component, the copolymer can be formed in that state and used as a hot melt-type adhesive composition. Accordingly, it is possible to heat and melt a hot melt-type adhesive composition formed in a predetermined shape using a conventional applier, to then apply the adhesive in a liquid state and harden the adhesive to produce the adhesive layer.

For pressure-sensitive adhesive sheets for a tire, a high applying amount, such as a thickness of 60 g/m² is normally used, so that there is the risk of the drying process limiting the manufacturing speed for a solvent-type adhesive. On the other hand, by applying a hot melt-type adhesive composition that does not require a drying process, there is a pronounced increase in speed for the application process, and the manufacturing cost can also be reduced. In addition, by using a hot melt-type adhesive composition, no solvent whatsoever or the minimum possible amount of solvent may be used, which is both economical and very advantageous from the viewpoint of environmental protection.

EXAMPLES

Example 1

1. Manufacturing Process

The following substances: 23% by weight of KRATON D-1112 (a SIS block copolymer with a diblock amount of 40% by weight and 15% by weight of styrene domain, made by KRATON Polymers); 50% by weight of T-480X (an aliphatic/aromatic petroleum resin with a softening point of 80° C. made by MITSUI Chemicals, Inc.) and 5% by weight of EXLON V-120 (a coumarone resin having a softening point of 120° C. made by Nippon Steel Chemical Co., Ltd.)as tackifier; 22% by weight of PUREFLEX SNH-100SP (a paraffin-base oil made by MITSUI Chemicals, Inc.) as a plasticizer; and 1% by weight of IRGANOX 1010 (a hindered phenol antioxidant made by Ciba Specialty Chemicals) as an antioxidant were uniformly mixed to form the hot melt-type adhesive composition as shown in Table 1, which was investigated.

Next, a die coater was used to melt the adhesive at 140° C. with the adhesive being applied with a thickness of 50 g/m onto a releasing film, which is composed of polyethylene terephthalate (hereinafter "PET") coated on one surface with silicone resin as a releasing agent, to form the adhesive layer.

Next, an aluminum-deposited layer side of a white coat PET film (thickness: 12 μm) on which a layer of aluminum has been deposited is adhered onto the adhesive layer on the releasing film to manufacture a pressure-sensitive adhesive sheet for a tire provided with the releasing film.

2. Evaluation (1) Loop Tack Adhesion

The obtained pressure-sensitive adhesive sheet for a tire is cut into tape-like pieces that are 25 mm wide and 250 mm long with 25 mm extension part at both ends. Next, with the adhesive layer surface on the outside, the pieces where set in loops with both ends together and the extension part at both ends were attached to the upper clamp of a tensile tester. On the other hand, a polyethylene panel (Standard test panel made by Nippon Testpanel Co., Ltd) is horizontally attached to the lower clamp of the tensile tester, the distance between the upper and lower clamps was set at 210 mm, and the upper clamp was lowered to 150 mm at a speed of 300 mm per minute. After this position has been held for 15 seconds, the upper clamp is withdrawn at a speed of 300 mm per minute, and the tensile load in the respective environmental conditions of 5° C. and 40° C. were measured as the loop tack adhesion (N/25 mm) at 5° C. and 40° C. The obtained results are shown in Table 1.

(2) Holding Power

The obtained pressure-sensitive adhesive sheet for a tire is adhered to a stainless plate and the time taken until a predetermined weight is dropped was measured with the conditions: a measured temperature at 40° C., a load of 1 kgf/cm$^2$, an adhering area of 25 mm by 25 mm (a measuring method as in accordance with JIS Z 0237 standard) The obtained results are shown in Table 1.

(3) Resistance to Peeling

The obtained pressure-sensitive adhesive sheets for a tire were cut into pieces that are 20 cm wide and 10 cm high and adhered onto studless tires (MZ-03 made by Bridgestone Corporation) in respective environments of 5° C. and 40° C. The tires were left in this state for 72 hours in the respective environments of 5° C. and 40° C., and then the adhering state of the pressure-sensitive adhesive sheets for a tire were visually observed and the resistance to peeling of the pressure-sensitive adhesive sheets for a tire was evaluated according to the following criteria.

VG: No lifting or peeling of the pressure-sensitive adhesive sheets for a tire was observed.
Good: A slight amount of lifting or peeling of the pressure-sensitive adhesive sheets for a tire was observed.
Fair: Lifting or peeling of the pressure-sensitive adhesive sheets for a tire was observed in some parts.
NG: Prominent lifting or peeling of the pressure-sensitive adhesive sheets for a tire was observed.

(4) Releasing Strength

The obtained pressure-sensitive adhesive sheets for a tire were cut into pieces that are 20 cm wide and 10 cm high and adhered onto studless tires (MZ-03 made by Bridgestone Corporation) in respective environments at 5° C. and 40° C. The tires were left in these conditions for 72 hours in the respective environments at 5° C. and 40° C., and then the strength required when releasing the sheets by hand was measured and the releasing strength was evaluated according to the following criteria.

VG: The sheets have a sufficient adhesion.
Good: The adhesion is a little weak, though this is not problematic for actual use
Fair: The adhesion is weak and the sheets easily peel off.
NG: There is almost no adhesion.

Examples 2 to 5

In the examples 2 to 5, a hot melt-type adhesive composition with the formulations as shown in Table 1 where applied onto a releasing film with a thickness of 50 g/m$^2$ by using a die coater in the same way as example 1. Next, white coat PET films (thickness: 12 µm) on which layers of aluminum have been deposited were adhered onto the adhesive layers on the releasing film to manufacture the respective pressure-sensitive adhesive sheets for a tire provided with a releasing film, which were then evaluated in the same way as the example 1. The obtained results are shown in Table 1.

Example 6

Aside from the use of a biaxial stretching polyester film (thickness: 50) that is white and opaque and includes internal cavities in place of the white coat PET film (thickness: 12 µm) of the example 1 on which a layer of aluminum has been deposited, a pressure-sensitive adhesive sheet for a tire provided with a releasing film was manufactured for the example 6 in the same way as the example 1, and this was then evaluated in the same way as the example 1. The obtained results are shown in Table 1.

As a result, in the evaluations of resistance to peeling and releasing strength for the examples 1 to 6, favorable adhesion properties were exhibited at both low temperature and high temperature conditions.

Comparative Examples 1 TO 5

In comparative examples 1 to 5, in the same way as for example 1, the hot melt-type adhesive compositions of the formulations as shown in Table 2 were applied onto a releasing film by using a die coater, so that the additional amount is 50 g/m$^2$. Next, white-coat PET films (thickness: 12 µm) on which layers of aluminum have been deposited were adhered onto the adhesive layers to manufacture pressure-sensitive adhesive sheets for a tire provided with a releasing film, which were then evaluated in the same way as the example 1. The obtained results are shown in Table 2.

As a result, for comparative example 1, the softening point of the EASTOTACK C115R (a hydrogenated aliphatic petroleum resin having a softening point of 115° C. made by Eastman Chemical Company) which was used in place of the T-480X tackifier of the example 1 was comparatively high, so that the loop tack adhesion at 5° C. was below the predetermined value to 7.5N/25 mm, resulting in the problem of peeling off being observed at low temperature.

In addition, in comparative example 2, a comparatively large amount of the T-480X tackifier of the example 1 was used alone, so that the loop tack adhesion at 40° C. was below the predetermined value to 4.5N/25 mm, resulting in a decrease of cohesive force and in problems regarding resistance to peeling and releasing strength at high temperature.

In the comparative example 3, KRATON D-1107 (an SIS block copolymer made by KRATON Polymers, with a diblock content of 15% by weight and a styrene domain content of a 15% by weight) was used in place of the KRATON D-1112 of the example 1. Since the diblock content was comparatively low, the loop tack adhesion at 5° C. was below the predetermined value to 10N/25 mm, resulting in problems regarding releasing strength and resistance to peeling off being observed at low temperature.

In the comparative example 4, KRATON D-1124 (an SIS block copolymer made by KRATON Polymers, with a diblock content of 30% by weight and a styrene domain content of 30% by weight) was used in place of the KRATON D-1112 of the example 1. Since the styrene domain content was comparatively high, the loop tack adhesion at 5° C. was considerably below the predetermined value to 2N/25 mm, resulting in problems regarding releasing strength and resistance to peeling off being observed at low temperature.

In the comparative example 5, the same SIS block copolymer, tackifier, and plasticizer as the example 1 were used, but the additional amount of plasticizer was increased relative to the example 1 and the additional amount of the SIS block copolymer was reduced relative to the example 1, so that the adhesion and cohesive force both fell, resulting in problems regarding releasing strength and resistance to peeling off being observed both at low temperature and at high temperature conditions.

Figure 4:
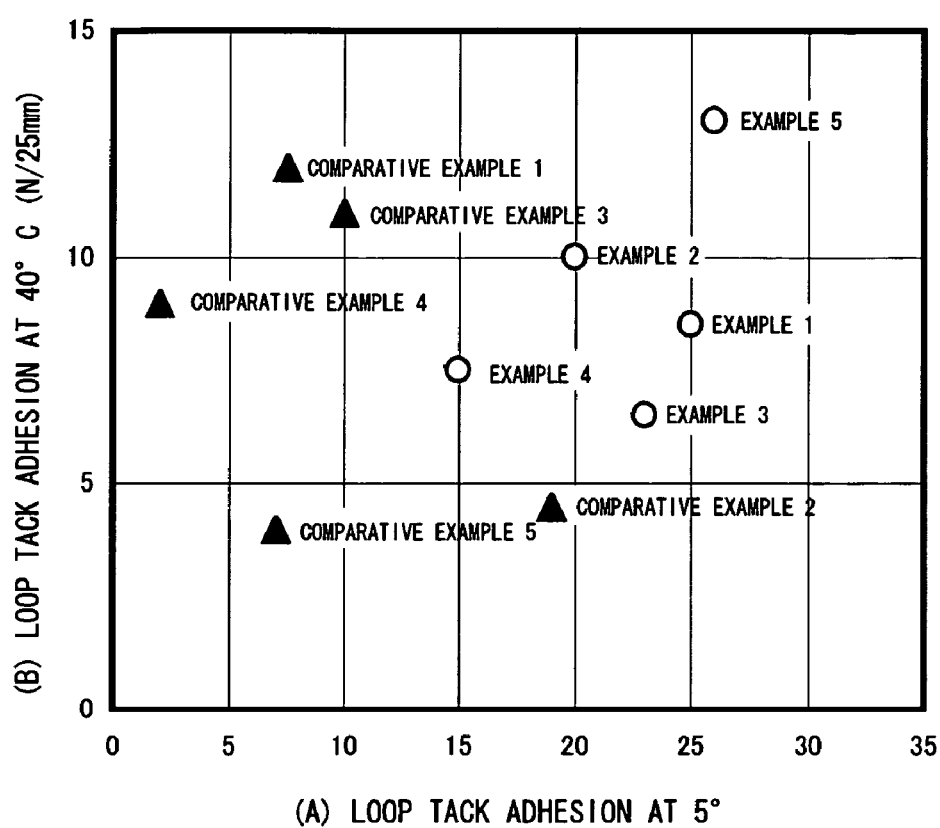
FIG. 4 is a graph showing the loop tack adhesion of various samples.

By bringing together the above results, it was found that as shown in FIG. 4, when the adhesive characteristics of a pressure-sensitive adhesive sheet for a tire satisfy the conditions (A) and (B), where (A) loop tack adhesion at 5° C. is 14N/25 mm or more, and (B) loop tack adhesion at 40° C. is 5N/25 mm or more, in evaluating of the resistance to peeling off and releasing strength, favorable characteristics were exhibited at both low temperature and high temperature conditions. That is, (A) and (B) above are important conditions in selecting a pressure-sensitive adhesive sheet for a tire that can be used in a wide range of temperature.

TABLE 1

| | | PRODUCT NUMBERS ETC. | EXAMPLE 1 | EXAMPLE 2 | EXAMPLE 3 | EXAMPLE 4 | EXAMPLE 5 | EXAMPLE 6 |
|---|---|---|---|---|---|---|---|---|
| FORMULATIONS | BLOCK COPOLYMER | D-1112 | 23.0 | 24.1 | 21.8 | 23.7 | 22.3 | 23.0 |
| | TACKIFIER | T-480X(WITH A SOFTENING POINT OF 80° C.) | 50.0 | 47.4 | 52.4 | 51.5 | 48.5 | 50.0 |
| | | V-120(WITH A SOFTENING POINT OF 120° C.) | 5.0 | 5.3 | 4.8 | 5.2 | 4.9 | 5.0 |
| | | TOTAL AMOUNT OF TACKIFIER | 55.0 | 52.7 | 57.2 | 56.7 | 53.4 | 55.0 |
| | PLASTICIZER | SNH-100SP | 22.0 | 23.2 | 21.0 | 19.6 | 24.3 | 22.0 |
| | TOTAL AMOUNT OF TACKIFIER AND PLASTICIZER | | 77.0 | 75.9 | 78.2 | 76.3 | 77.7 | 77.0 |
| | TOTAL AMOUNT OF BLOCK COPOLYMER, TACKIFIER AND PLASTICIZER | | 100 | 100 | 100 | 100 | 100 | 100 |
| EVALUATIONS | ANTIOXIDANT | Irganox1010 | 1 | 1 | 1 | 1 | 1 | 1 |
| | LOOP TACK ADHESION (N/25 mm) | 5° C. | 25.0 | 20.0 | 23.0 | 15.0 | 26.0 | 23.0 |
| | | 40° C. | 8.5 | 10.0 | 6.5 | 7.5 | 13.0 | 9.0 |
| | HOLDING POWER (S) | 40° C. | 5000 | 8000 | 3000 | 8000 | 2500 | 5100 |
| | RESISTANCE TO PEELING OFF | 5° C. | VG | GOOD | VG | GOOD | VG | VG |
| | | 40° C. | VG | GOOD | GOOD | GOOD | GOOD | VG |
| | RELEASING STRENGTH | 5° C. | VG | GOOD | VG | GOOD | VG | VG |
| | | 40° C. | GOOD | GOOD | GOOD | GOOD | VG | GOOD |

TABLE 2

| | | PRODUCT NUMBERS ETC. | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|---|---|
| FORMULATIONS | BLOCK COPOLYMER | D-1112 | 23.0 | 23.0 | — | — | 14.0 |
| | | D-1107 | — | — | 23.0 | — | — |
| | | D-1124 | — | — | — | 23.0 | — |
| | TACKIFIER | T-480X (WITH A SOFTENING POINT OF 80° C.) | — | 55.0 | 50.0 | 50.0 | 50.0 |
| | | C115R(WITH A SOFTENING POINT OF 115° C.) | 50.0 | — | — | — | — |
| | | V-120(WITH A SOFTENING POINT OF 120° C.) | 5.0 | — | 5.0 | 5.0 | 5.0 |
| | | TOTAL AMOUNT OF TACKIFIER | 55.0 | 55.0 | 55.0 | 55.0 | 55.0 |
| | PLASTICIZER | SNH-100SP | 22.0 | 22.0 | 22.0 | 22.0 | 31.0 |
| | TOTAL AMOUNT OF TACKIFIER AND PLASTICIZER | | 77.0 | 77.0 | 77.0 | 77.0 | 86.0 |
| | TOTAL AMOUNT OF BLOCK COPOLYMER, TACKIFIER AND PLASTICIZER | | 100 | 100 | 100 | 100 | 100 |
| EVALUATIONS | ANTIOXIDANT | Irganox1010 | 1 | 1 | 1 | 1 | 1 |
| | LOOP TACK ADHESION (N/25 mm) | 5° C. | 7.5 | 19.0 | 10.0 | 2.0 | 7.0 |
| | | 40° C. | 12.0 | 4.5 | 11.0 | 9.0 | 4.0 |
| | HOLDING POWER (S) | 40° C. | 15000 | 1200 | 14000 | 20000 | 500 |
| | RESISTANCE TO PEELING OFF | 5° C. | FAIR | GOOD | FAIR | NG | FAIR |
| | | 40° C. | GOOD | FAIR | GOOD | GOOD | FAIR |
| | RELEASING STRENGTH | 5° C. | FAIR | GOOD | FAIR | NG | FAIR |
| | | 40° C. | GOOD | FAIR | GOOD | FAIR | NG |

INDUSTRIAL APPLICABILITY

According to the pressure-sensitive adhesive sheet for a tire and the method for manufacturing a pressure-sensitive adhesive sheet for a tire of the present invention, by using the hot melt-type adhesive composition having the specified adhesive characteristics (a specified loop tack adhesion), it is possible for a pressure-sensitive adhesive sheet for a tire to accurately adhere onto a tire at low temperature, and to strongly adhere onto studless tires for which adhering is difficult. Also, since there is little deterioration in the adhesive characteristics at high temperature, such pressure-sensitive adhesive sheets for a tire can be favorably used with car tires, aircraft tires, bicycle tires, truck tires, and other types of tires.

In addition, the pressure-sensitive adhesive sheet for a tire according to the present invention can be favorably used with various kinds of rubber products aside from tires, with the same effects as the present invention being realized.

What is claimed is:

1. A pressure-sensitive adhesive sheet for a tire comprising a substrate and an adhesive layer, wherein the adhesive layer includes a hot melt-type adhesive composition and satisfies the adhesive characteristics (A) and (B), where
    (A) loop tack adhesion at 5° C. is 14N/25 mm or more, and
    (B) loop tack adhesion at 40° C. is 5N/25 mm or more,
    and the hot melt-type adhesive composition comprises:
    (C) 15 to 40% by weight of an ABA-type block copolymer,
    (D) 30 to 70% by weight of two or more types of a tackifier having different softening points and
    (E) 10 to 40% by weight of plasticizer, as main components wherein,
    (C)' the hot melt-type adhesive composition is a mixture of styrene-isoprene-styrene copolymer (SIS) as the ABA-type block copolymer and styrene-isoprene copolymer (S1) as an AB-type block copolymer, and the additional amount of the AB-type block copolymer is at least 30% by weight with respect to the overall weight and
    (D)' with at least one out of the (D) two or more types of a tackifier having different softening points being a tackifier with a softening point of 60 to 100° C. as measured in accordance with JIS K 2207 standard.

2. The pressure-sensitive adhesive sheet far a tire according to claim 1, wherein a holding power of the hot melt-type adhesive composition is in a range of 1,500 to 12,000 seconds as measured in accordance with JIS K 2207 standard.

3. The pressure-sensitive adhesive sheet for a tire according to claim 1, wherein the ABA-type block copolymer has a content of polystyrene domain that is 20% by weight or less with respect to 100% by weight of the ABA-type block copolymer.

4. The pressure-sensitive adhesive sheet for a tire according to claim 1, wherein the plasticizer is paraffin-base process oil.

5. The pressure-sensitive adhesive sheet for a tire according to claim 1, wherein a metal layer is provided between the substrate and the adhesive layer.

6. A meted for manufacturing a pressure-sensitive adhesive sheet for a tire including a substrate and an adhesive layer, comprising a step of forming the adhesive layer by applying a hot melt-type adhesive composition that satisfies adhesive characteristics (A) and (B) on the substrate, where
    (A) loop tack adhesion at 5° C. is 14N/25 mm or more, and
    (B) loop tack adhesion at 40° C. is 5N/25 mm or more,
    and the hot melt-type adhesive composition comprises:
    (C) 15 to 40% by weight of an ABA-type block copolymer,
    (D) 30 to 70% by weight of two or more types of a tackifier having different softening points and
    (E) 10 to 40% by weight of plasticizer, as main components wherein;
    (C)' the hot melt-type adhesive composition is a mixture of styrene-isoprene-styrene copolymer (SIS) as the ABA-type block copolymer and styrene-isoprene copolymer (S1) as an AB-type block copolymer and the additional amount of the AB-type block copolymer is at least 30% by weight with respect to the overall weight and
    (D)' with at least one out of the (D) two or more types of a tackifier having different softening points being a tackifier with a softening point of 60 to 100° C. as measured in accordance with JIS K 2207 standard.

* * * * *